United States Patent [19]
Walther et al.

[11] 3,759,307
[45] Sept. 18, 1973

[54] RIMS

[75] Inventors: William D. Walther, Dayton; Robert A. Deregnaucourt, Centerville, both of Ohio

[73] Assignee: The Dayton Steel Foundry Company, Dayton, Ohio

[22] Filed: Jan. 3, 1972

[21] Appl. No.: 214,994

[52] U.S. Cl.................................. 152/396, 301/12
[51] Int. Cl............................................... B60c 7/24
[58] Field of Search........................... 152/396, 397; 301/12

[56] References Cited
UNITED STATES PATENTS

| | | | |
|---|---|---|---|
| 3,282,321 | 11/1916 | Johnson | 152/396 |
| 1,330,061 | 2/1920 | Dillet | 152/396 |
| 2,868,261 | 1/1959 | Powerss | 152/396 |
| 3,341,255 | 9/1967 | Malthaner | 301/12 |

*Primary Examiner*—James B. Marbert
*Attorney*—Mack D. Cooke, II

[57] ABSTRACT

A demountable rim having fixed and removable bead flanges for mounting tires on a wheel and having safety features in compliance with Federal Motor Vehicle Safety Standard No. 120. The removable bead flange is carried on and mounted within an edge of the rim base portion and a series of circumferentially located capped bolts loosely connect the removable flange to the rim edge to maintain said flange on the rim in the event a tire mounted on the rim is unintentionally deflated. Various forms of rim edges and removable flanges are provided.

7 Claims, 6 Drawing Figures

PATENTED SEP 18 1973  3,759,307

PATENTED SEP 18 1973 3,759,307

RIMS

BACKGROUND OF THE INVENTION

A prior art two-piece rim for mounting tires on a wheel is disclosed in U.S. Pat. No. 3,421,797.

Recently, the Department of Transportation has proposed a new Federal Motor Vehicle Safety Standard No. 120, which would establish tire and rim selection requirements. These requirements now bear the proposed effective date, Jan. 1, 1973.

The present invention seeks to ensure rim compliance with those portions of Safety Standard No. 120 which now read, in part:

"5·3 Rim performance. Each rim shall be capable of meeting the performance requirements of § 5·3·2 . . . when used with any tire, . . .

"5·3·2 The tire shall not become completely disengaged from the rim, when the rim is tested according to the following procedure.

a. Mount the tire on the rim.
 b. Mount the rim in a single-tire, single axle-position (i.e., not a dual-tire or tandem axle-installation) in the left front position on a four-wheeled vehicle loaded so that the tire is loaded to its maximum load rating.
 c. Adjust the tire pressure to the tires maximum inflation pressure.
 d. Drive the vehicle in a straight line on a level surface at 60 m.p.h., or at the tires maximum speed, if any, as marked on the tire, whichever is less.
 e. Deflate the tire completely . . . through an opening . .
 f. As soon as the tire is deflated, decelerate the vehicle to a stop at a rate of 8 ft. per second."

The prior art relating to two-piece rims for mounting tires is not understood as complying with the above quoted requirements of Safety Standard No. 120.

SUMMARY OF THE INVENTION

It is the principal object of the invention to provide a two-piece rim which will comply with the above quoted requirements of Safety Standard No. 120.

It is a further object to provide a two-piece rim with a removable bead flange, useable in various configurations of bead flanges and rim base portions and intended to comply with the above quoted requirements of Safety Standard No. 120.

These and other objects of the present invention, and the advantages thereof, will be apparent in view of the Detailed Description of the Invention as set forth below.

In general, the invention relates to a demountable rim having fixed and removable bead flanges for mounting a tire on a wheel. The bead flanges are separated by an annular rim base portion, the fixed flange being formed integrally therewith. The removable flange is carried on and mounted within an edge of the rim base portion. The radially outer portion of the rim edge has a cove area for seating of a correspondingly-shaped mating face of a base portion of the removable flange, and the radially inner portion of the rim edge has a gutter flange for seating the rim on a wheel.

A demountable rim according to the invention is characterized in that a series of circumferentially located capped bolts loosely connect the removable flange to the rim edge to maintain the flange base portion within the cove area in the event a tire on the rim is unintentionally deflated.

In the embodiment of FIG. 1, the gutter flange has a radially directed portion with a series of circumferentially located axially directed slots therethrough. Each of the capped bolts is of a smaller diameter than the slots and is inserted through the slots and into a receiving bore in the base portion of the removable flange.

In the embodiment of FIG. 2, the gutter flange has an axially extending portion with a series of radially directed receiving bores therein. The removable flange has an axially directed portion with a series of circumferentially located radially directed slots therethrough and overlying the gutter flange. Each of the capped bolts is of a smaller diameter than the slots and is inserted through the slots and into a receiving bore in the axially extending portion of the gutter flange.

In the embodiment of FIG. 3, the gutter flange has an axially extending portion with a series of axially directed receiving bores therein. The removable flange has a radially inwardly directed portion extending from an axially directed portion and the radially inwardly directed portion has a series of circumferentially located axially directed slots therethrough. Each of the capped bolts is of a smaller diameter than the slots and is inserted through the slots and into a receiving bore in the axially extending portion of the gutter flange.

In the embodiment of FIG. 4, the gutter flange has an axially extending portion terminating in an inwardly inclined radially outer surface with a series of inwardly inclined receiving bores therein. The removable flange has an axially directed inwardly inclined portion with a series of circumferentially located inwardly inclined slots therethrough and overlying the gutter flange. Each of the capped bolts is of a smaller diameter than the slots and is inserted through the slots into a receiving bore in the inwardly inclined portion of the gutter flange.

In the embodiment of FIG. 5, the gutter flange extends axially from an additional radially dropped portion of the rim base. The radially inner portion of the rim edge has a series of circumferentially located outwardly inclined slots therethrough. Each of the capped bolts is of a smaller diameter than the slots and is inserted through the slots into a receiving bore in the base portion of the removable flange.

In the embodiment of FIG. 6, the gutter flange extends axially away from an additional radially dropped portion of the rim base, and the additional portion has a series of radially directed receiving bores therein. The removable flange has an axially directed portion with a series of circumferentially located radially directed slots therethrough and overlying the additional portion. Each of the capped bolts is of a smaller diameter than the slots and is inserted into a receiving bore in the additional portion.

DETAILED DESCRIPTION OF THE INVENTION

Figure 1:
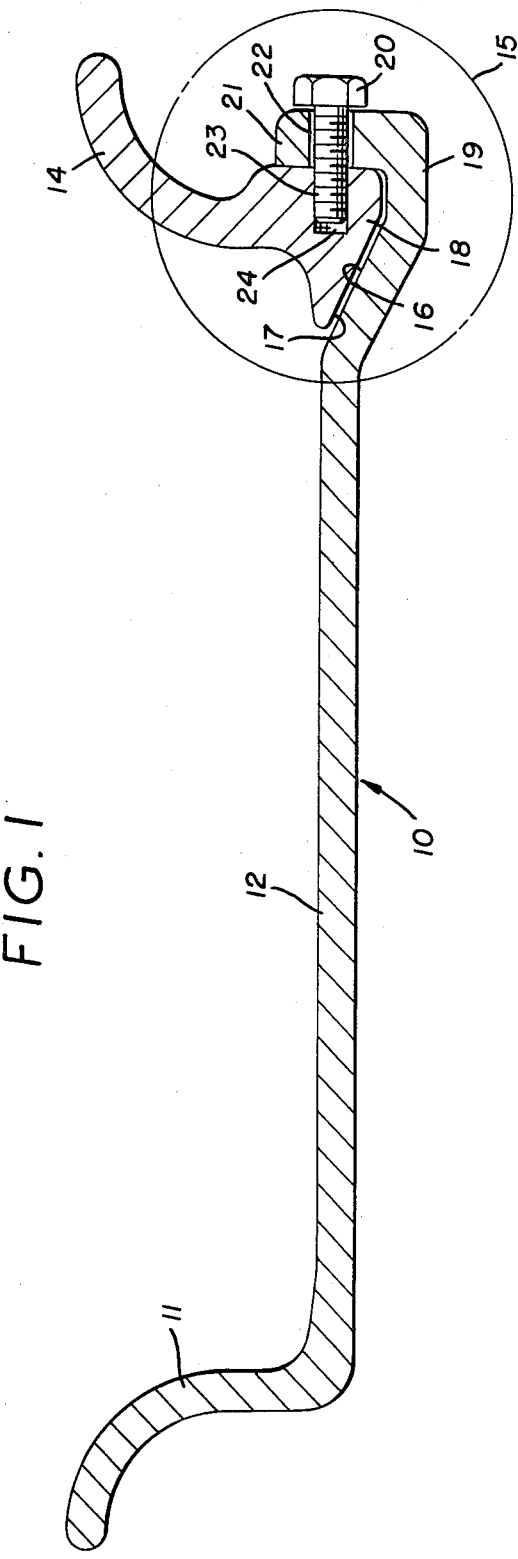
FIG. 1 is a view in section of a rim, according to the invention, with a removable bead flange connected to a gutter flange having a radially directed portion.

In each of the embodiments depicted herein, a demountable rim according to the invention is indicated generally by the numeral 10. A tire (not shown) is mounted between a fixed bead flange 11, formed integrally with the rim base portion 12, and a removable bead flange 14 which is carried on and mounted within an edge 15 of the rim base portion 12. The radially outer portion of the rim edge 15 has a cove area 16 for seating of a correspondingly-shaped mating face 17 of a base portion 18 of the removable flange 14. The radially inner portion of the rim edge 15 has a gutter flange 19 for seating of the rim on a wheel (not shown). A series of circumferentially located capped bolts 20 loosely connect the removable flange 14 to the rim edge 15 to maintain the flange base portion 18 within the cove area 16 in the event a tire on the rim is unintentionally deflated.

The gutter flange 19, depicted in FIG. 1, has a radially directed portion 21. A series of axially directed slots 22 are circumferentially located in the radially direction portion 21. Capped bolts 20, preferably self-locking, having a threaded portion 23 of smaller diameter than slots 22, pass loosely therethrough. The base portion 18 of the bead flange 14 has a corresponding series of axially directed receiving bores 24 therein to engage bolts 20. As viewed in FIG. 1, the bolts 20 do not contact radially directed portion 21, which permits limited movement of flange base portion 18 within cove area 16 without any load on bolts 20 during normal operation.

Figure 2:
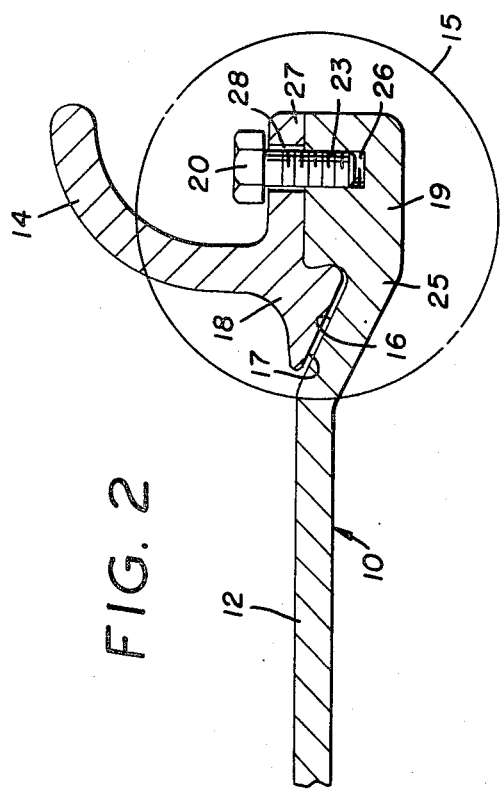
FIG. 2 is a view in section of a rim, according to the invention, with a removable bead flange connected to a gutter flange having an axially extending portion.

The gutter flange 19, depicted in FIG. 2, has an axially extending portion 25. A series of radially directed receiving bores 26 are circumferentially located in the axially extending portion 25. The removable flange 14 has an axially directed portion 27 with a corresponding series of circumferentially located radially directed slots 28 therethrough and overlying the gutter flange 19. Capped bolts 20, preferably self-locking, having a threaded portion 23 of smaller diameter than slots 28, pass loosely therethrough, and into the receiving bores 26. As viewed in FIG. 2, the bolts 20 do not contact the axially directed portion 27, which permits limited movement of flange base portion 18 within cove area 16 without any load on bolts 20 during normal operation.

Figure 3:
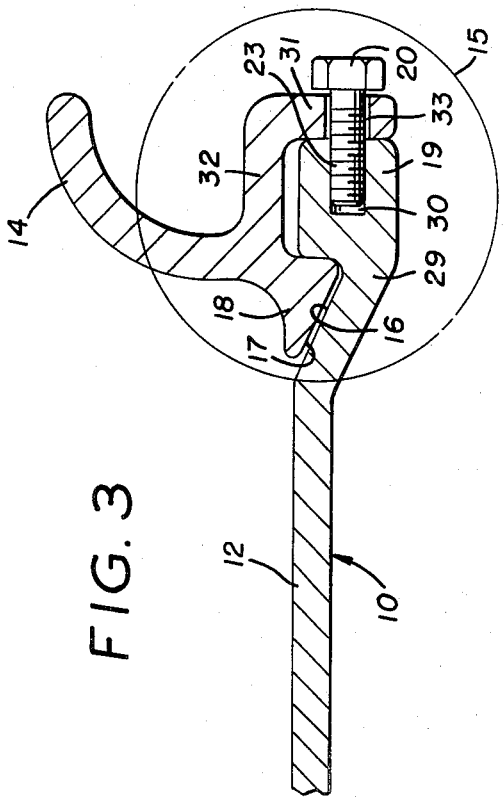
FIG. 3 is a view in section of a rim, according to the invention, with a removable bead flange connected to a gutter flange having an axially extending portion.

The gutter flange 19, depicted in FIG. 3, has an axially extending portion 29. A series of axially directed receiving bores 30 are circumferentially located in the axially extending portion 29. The removable flange 14 has an L-shaped projection comprising a radially inwardly directed portion 31 extending from an axially directed portion 32. The radially inwardly directed portion 31 has a corresponding series of circumferentially located, axially directed slots 33 therethrough. Capped bolts 20, preferably self-locking, having a threaded portion 23 of smaller diameter than slots 33, pass loosely therethrough and into the receiving bores 30. As viewed in FIG. 3, the bolts 20 do not contact the radially inwardly directed portion 31, which permits limited movement of flange base portion 18 within cove area 16 without any load on bolts 20 during normal operation.

Figure 4:
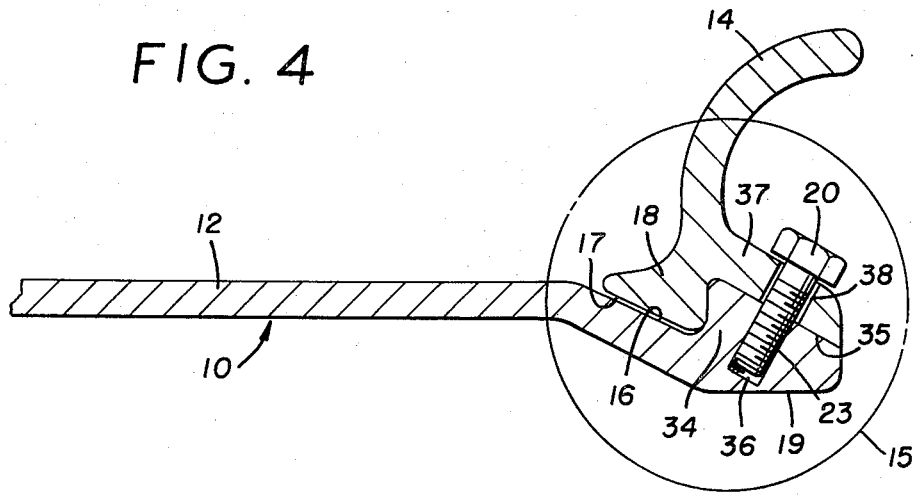
FIG. 4 is a view in section of a rim, according to the invention, with a removable bead flange connected to a gutter flange having an axially extending portion terminating in an inwardly inclined surface.

The gutter flange 19, depicted in FIG. 4, has an axially extending portion 34 terminating in an inwardly inclined radially outer surface 35 having a series of inwardly inclined receiving bores 36 therein. The removable flange 14 has an axially directed, inwardly inclined portion 37, with a corresponding series of circumferentially located, inwardly inclined slots 38 therethrough and overlying the gutter flange 19. Capped bolts 20, preferably self-locking, having a threaded portion 23 of smaller diameter than slots 38 pass loosely therethrough and into receiving bores 36. As viewed in FIG. 4, the bolts 20 do not contact the inwardly inclined portion 37, which permits limited movement of flange base portion 18 within cove area 16 without any load on bolts 20 during normal operation.

Figure 5:
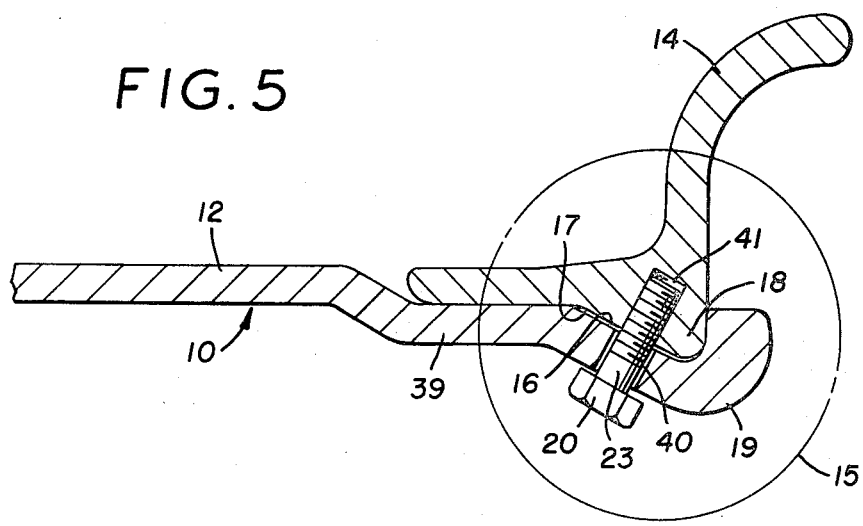
FIG. 5 is a view in section of a rim, according to the invention, with a removable bead flange connected to a gutter flange extending axially from an additional radially dropped portion.

The gutter flange 19, depicted in FIG. 5, extends axially from an additional radially dropped portion 39 of the rim base 12. The radially inner portion of the rim edge 15 has a series of circumferentially located, outwardly inclined slots 40 therethrough. Capped bolts 20, preferably self-locking having a threaded portion 23, of smaller diameter than slots 40, pass loosely therethrough. The base portion 18 of the bead flange 14 has a corresponding series of outwardly inclined receiving bores 41 therein to engage bolts 20. As viewed in FIG. 5 the bolts 20 do not contact the radially inner portion of the rim edge 15, which permits limited movement of flange base portion 18 within cove area 16 without any load on bolts 20 during normal operation.

Figure 6:
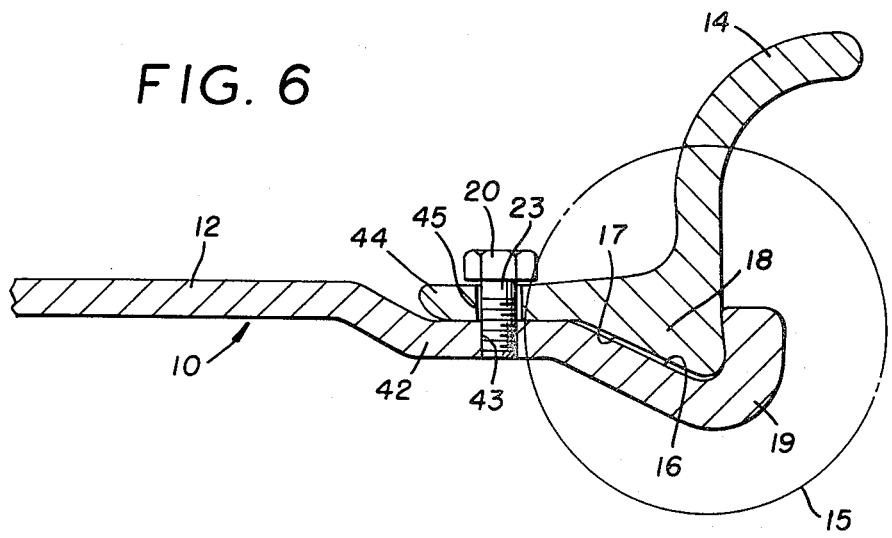
FIG. 6 is a view in section of a rim, according to the invention, with a removable bead flange connected to a radially dropped portion axially inwardly of the gutter flange.

The gutter flange 19, depicted in FIG. 6, extends axially away from an additional radially dropped portion 42 of the rim base 12. A series of radially directed receiving bores 43 are circumferentially located in the additional portion 42. The removable flange 14 has an axially directed portion 44, with a corresponding series of circumferentially located, radially directed slots 45 therethrough and overlying the additional portion 42. Capped bolts 20, preferably self-locking, having a threaded portion 23 of smaller diameter than slots 45, pass loosely therethrough and into receiving bores 43. As viewed in FIG. 6, the bolts 20 do not contact the axially directed portion 44 of bead flange 14, which permits limited movement of flange base portion 18 within cove area 16 without any load on bolts 20 during normal operation.

What is claimed is:

1. A demountable rim having fixed and removable bead flanges, the bead flanges being separated by an annular rim base portion, the fixed flange being formed integrally with the rim base portion, the removable flange being carried on and mounted within an edge of the rim base portion, the radially outer portion of said rim edge having a cove area for seating of a correspondingly-shaped mating face of a base portion of said removable flange, the radially inner portion of said rim edge having a gutter flange for seating of said rim on a wheel, characterized in that, a series of circumferentially located capped bolts loosely connect said removable flange to said rim edge to maintain said flange base portion within said cove area in the event a tire on said rim is unintentionally deflated.

2. A demountable rim according to claim 1, characterized in that, said gutter flange has a radially directed portion with a series of circumferentially located axially directed slots therethrough, each of said capped bolts being of smaller diameter than said slots and being inserted therethrough into a receiving bore in said base portion of the removable flange.

3. A demountable rim according to claim 1, characterized in that, said gutter flange has an axially extending portion with a series of radially directed receiving bores therein and said removable flange has an axially directed portion with a series of circumferentially located radially directed slots therethrough and overlying said gutter flange, each of said capped bolts being of smaller diameter than said slots and being inserted therethrough into a receiving bore in said axially extending portion of said gutter flange.

4. A demountable rim according to claim 1, characterized in that, said gutter flange has an axially extending portion with a series of axially directed receiving bores therein and said removable flange has a radially inwardly directed portion extending from an axially directed portion, said radially inwardly directed portion having a series of circumferentially located axially directed slots therethrough, each of said capped bolts being of smaller diameter than said slots and being inserted therethrough into a receiving bore in said axially extending portion of said gutter flange.

5. A demountable rim according to claim 1, characterized in that, said gutter flange has an axially extending portion terminating in an inwardly inclined radially outer surface with a series of inwardly inclined receiving bores therein and said removable flange has an axially directed inwardly inclined portion with a series of circumferentially located inwardly inclined slots therethrough and overlying said gutter flange, each of said capped bolts being of smaller diameter than said slots and being inserted therethrough into a receiving bore in said inwardly inclined portion of said gutter flange.

6. A demountable rim according to claim 1, characterized in that, said gutter flange extends axially from an additional radially dropped portion of said rim base and the radially inner portion of said rim edge has a series of circumferentially located outwardly inclined slots therethrough, each of said capped bolts being of smaller diameter than said slots and being inserted therethrough into a receiving bore in said base portion of the removable flange.

7. A demountable rim according to claim 1, characterized in that, said gutter flange extends axially from an additional radially dropped portion of said rim base, said additional portion has a series of radially directed receiving bores therein and said removable flange has an axially directed portion with a series of circumferentially located radially directed slots therethrough and overlying said additional portion, each of said capped bolts being of smaller diameter than said slots and being inserted into a receiving bore in said additional portion.

* * * * *